(12) United States Patent
Botha

(10) Patent No.: US 8,461,991 B2
(45) Date of Patent: Jun. 11, 2013

(54) SECURITY LIGHT WITH PLURAL POSSIBLE DIRECTIONS OF ILLUMINATION

(75) Inventor: Gideon Botha, Cape Town (ZA)

(73) Assignee: Nightwatcher Electronics (Pty) Ltd, Western Cape Province (ZA)

( * ) Notice: Subject to any disclaimer, the term of this patent is extended or adjusted under 35 U.S.C. 154(b) by 296 days.

(21) Appl. No.: 12/756,519

(22) Filed: Apr. 8, 2010

(65) Prior Publication Data

US 2010/0259383 A1    Oct. 14, 2010

Related U.S. Application Data

(60) Provisional application No. 61/167,901, filed on Apr. 9, 2009.

(51) Int. Cl.
*G08B 13/00* (2006.01)

(52) U.S. Cl.
USPC .......................... 340/541; 340/565; 362/276

(58) Field of Classification Search
USPC .................................. 340/541, 565; 362/276
See application file for complete search history.

(56) References Cited

U.S. PATENT DOCUMENTS

| | | | | |
|---|---|---|---|---|
| 5,649,761 | A * | 7/1997 | Sandell et al. | 362/276 |
| 6,175,309 | B1 * | 1/2001 | Drake et al. | 340/545.3 |
| 2003/0058654 | A1 * | 3/2003 | Pastrick et al. | 362/494 |
| 2006/0250237 | A1 * | 11/2006 | Whitten et al. | 340/541 |

* cited by examiner

*Primary Examiner* — George Bugg
*Assistant Examiner* — Sharmin Akhter
(74) *Attorney, Agent, or Firm* — Fitch, Even, Tabin & Flannery, LLP

(57) ABSTRACT

A security light is provided comprising a mounting base for attachment to a support therefor; sensor means on the mounting base for detecting the presence of a person or moving object within a radial range of the sensor means and within any one of a plurality of angularly adjacent sectors radiating from the mounting base that together cover an angular field of operation of the security light. A light source and reflector assembly has an angular field of illumination at least equal to the angular field of each of the angularly adjacent sectors and is angularly movable relative to the mounting base between a plurality of positions corresponding to the plurality of angularly adjacent sectors so as to be selectively directed in a direction in which the field of illumination covers an entire sector. A stepper motor is provided for rotating the light source assembly between said possible positions in response to activation of the sensor means associated with a particular one of the adjacent sectors and an associated microcontroller that is connected to said sensor means is programmed to cause the stepper motor to receive a required number of electrical pulses to move the light source assembly angularly, as may be necessary, such that it becomes directed towards a sector in which the sensor means detected the presence of a person or moving object.

11 Claims, 2 Drawing Sheets

SECURITY LIGHT WITH PLURAL POSSIBLE DIRECTIONS OF ILLUMINATION

CROSS-REFERENCE TO RELATED APPLICATION

This application claims benefit under 35 U.S.C. §119 (e) to United States Provisional Patent Application No. 61/167,901 filed on Apr. 9, 2009, the entire content of which is hereby incorporated herein by reference in its entirety.

FIELD OF THE INVENTION

This invention relates to a security light with plural possible directions of illumination relative to a mounting base.

BACKGROUND TO THE INVENTION

European patent publication number EP 0899701 describes a security light that has tracking means for moving the security light to focus on a moving object detected by a sensor arrangement that initially detects the general direction in the form of a sector shaped field with respect to the location of the security light and thereafter finely tracks the moving object to focus a beam of light reasonably accurately in the direction thereof. The difficulty with this arrangement is that it is costly because of the rather complicated arrangement of sensors and control mechanism, and it is furthermore considered by applicant, to be unnecessarily complex having regard to the generally diffuse nature of light emitted by a typical security light.

Applicant's own proposal that is published as international patent publication number WO2007147179 describes a security device that includes a somewhat simplified security light that includes multiple sensors and a motor for rotating the security light to one of multiple directions according to movement detected by a sensor. This publication is, however, silent as regards any practical, cost-effective security light that can be manufactured relatively inexpensively and that is substantially maintenance free.

OBJECT OF THE INVENTION

It is an object of this invention to provide an integrated self contained security light with plural possible directions of illumination that is, at least in some embodiments, a cost-effective security item.

SUMMARY OF THE INVENTION

In accordance with this invention there is provided a security light comprising a mounting base for attachment to a support therefor; sensing means on the mounting base for detecting the presence of a person or moving object within a range of the sensor means and within any one of a plurality of angularly adjacent sectors radiating from the mounting base that together cover an angular field of operation of the security light; a light source and reflector assembly having an angular field of illumination at least equal to the angular field of each of the angularly adjacent sectors, said light source assembly being angularly movable relative to the mounting base between a plurality of positions corresponding to the plurality of angularly adjacent sectors so as to be selectively directed in a direction in which the field of illumination covers an entire sector; a stepper motor for rotating the light source assembly between said possible positions in response to activation of the sensor means associated with a particular one of the adjacent sectors; and a microcontroller connected to said sensor means and to the stepper motor and programmed to cause the stepper motor to receive a required number of electrical pulses to move the light source assembly angularly, as may be necessary, such that it becomes directed towards a sector in which the sensor means detected the presence of a person or moving object.

Further features of the invention provide for the number of adjacent sectors to be two, three, or four with a preferred number being three; for there to be a separate sensor for sensing the presence of a person or moving object in each of the adjacent sectors; for the light source to be a floodlight typical of security light installations; and for the mounting base to be adapted for mounting to an upright mounting surface such as that of a wall in which instance the light source assembly is angularly movable about a generally upright axis.

Still further features of the invention provide for the microcontroller to be programmed to cause the light source to be switched on and off in response to the detection of a person or moving object by the sensor means with the optional provision of an override of a daylight switch; for the microcontroller to be programmed to switch off the light source a predetermined time after the sensor means fails to detect any presence of a person or moving object; for the microcontroller to be programmed to return the light source to a predetermined default angular position when the sensor means fails to detect any presence of a person or moving object; and for the microcontroller to be programmed to carry out a self calibration procedure from time to time and optionally after a predetermined number of angular movements or events of activation of the security light have occurred.

Detection of a person or moving object by the sensor means may take place on the basis of any suitable technology and may be on the basis of a passive infrared sensor, a movement sensor, combination sensors, or any other sensor that may in the future become available. In each instance the sensor may optionally include electronic circuitry for attempting to distinguish sensed movements or bodies of persons from those of other moving or living things such as pets and also moving plants such as trees. Obviously, the sensor means may not be able to distinguish the presence of persons from other moving or living things according to the sophistication of the technology employed and the nature of the person or moving object In addition to the primary detection means of this invention, the use of other integrated supplementary detection devices which may include but not be restricted to digital camera technology mounted within the rotating head of the assembly, which may be utilised to act in such a manner as to provide the user with video feedback of an activated unit. Such digital camera technology may include but not be restricted to wireless video camera's with remote receivers, either fixed or portable and internal memory based cameras to record events as they occur. The video facility may include or exclude the use of audio feed capability as well.

Wireless audible alarm technology may be integrated into the product as a means of intruder alert. If the sensors on the light assembly are activated as a result of detecting a person or moving object, a signal is transmitted wirelessly to the remote receiver unit. This wireless remote unit may include the use of visual activation by means of but not restricted to LED indicators.

In order that the invention may be more fully understood one embodiment thereof will now be described by way of example with reference to the accompanying drawings.

DETAILED DESCRIPTION WITH REFERENCE TO THE DRAWINGS

Figure 1:
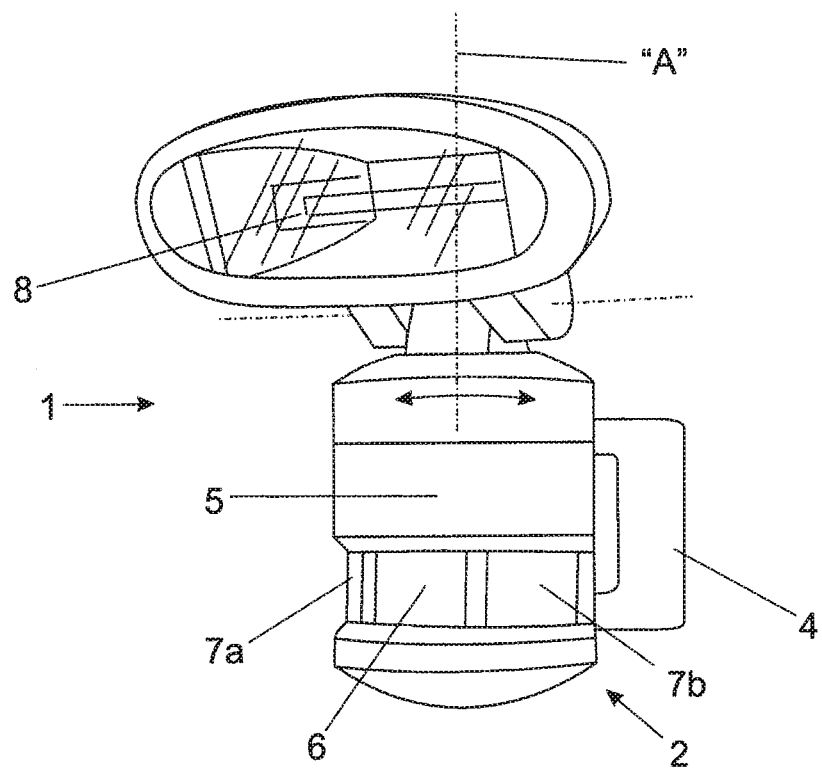
FIG. 1 is a schematic three-dimensional view of one embodiment of security light according to the invention.
Figure 2:
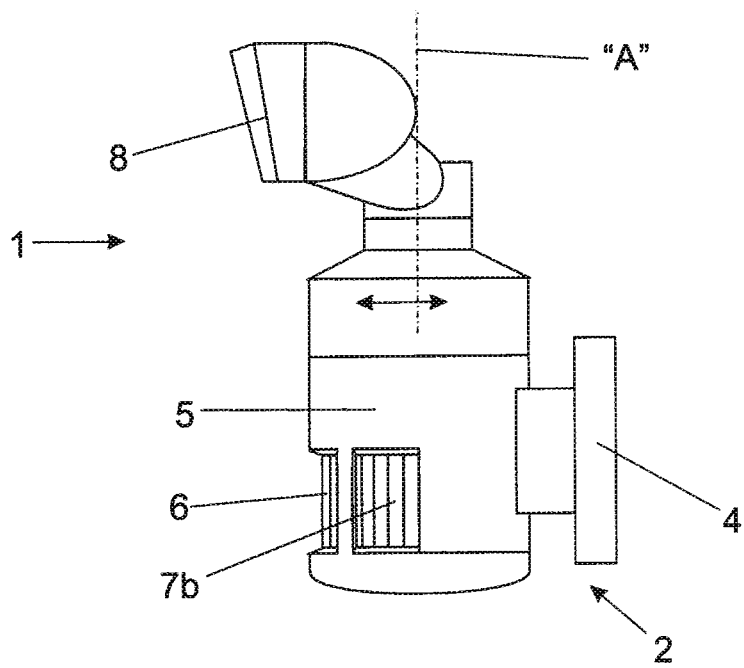
FIG. 2 is a schematic side view thereof.
Figure 3:
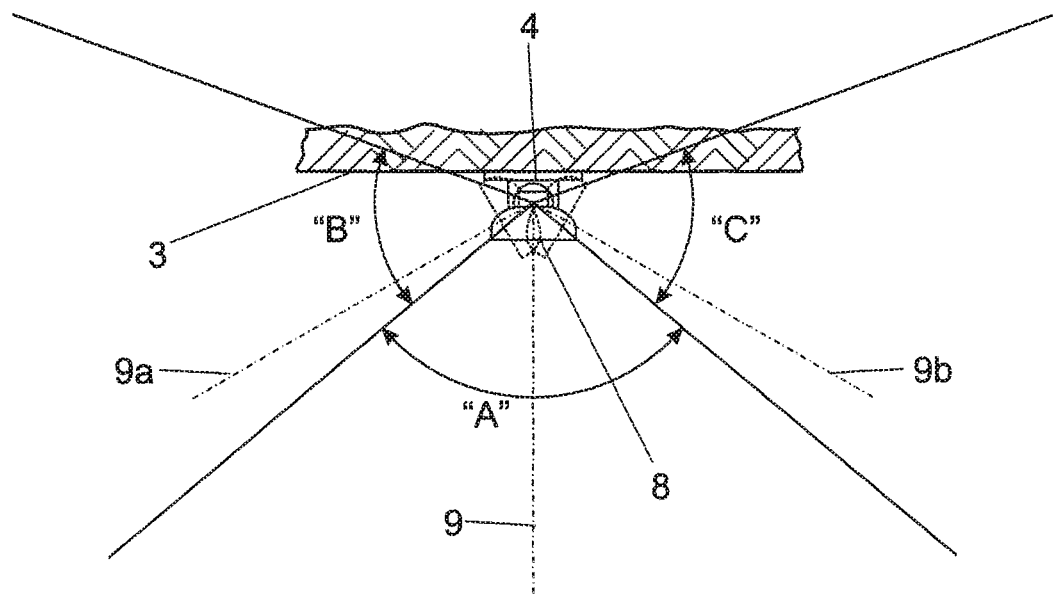
FIG. 3 is a schematic plan view showing the adjacent sectors and the plural directions of illumination of the security light, in use.
Figure 4:
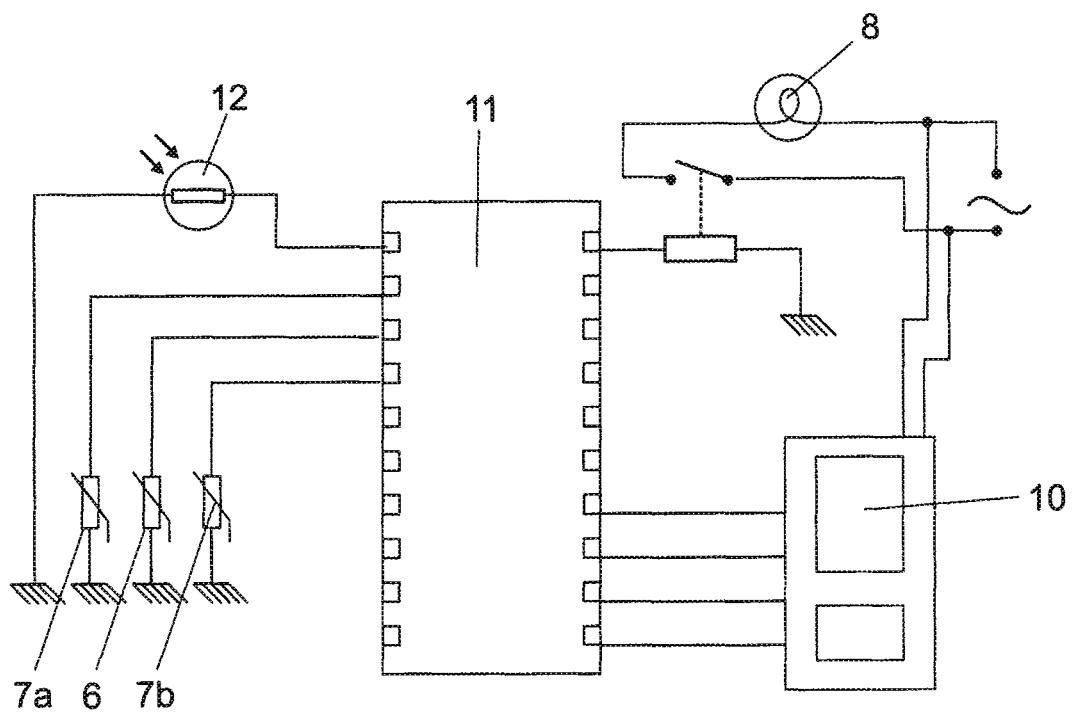
FIG. 4 is a schematic circuit diagram of the controller of the security light of this embodiment of the invention.

In the embodiment of the invention illustrated in the drawings, a security light that is generally indicated by numeral (1) has a mounting base (2) for attachment to a support therefor such as a wall (3), as illustrated in FIG. 3.

The mounting base has a mounting flange (4) and a housing (5) that houses, in this instance, three angularly spaced sensors (6, 7a, and 7b), typically of the PIR (passive infrared) type, motion detecting type or a combination type for detecting a person or moving object within a radial range of each of the sensors. As indicated above, the sensors may include electronic circuitry that is designed to distinguish between a person or moving object typically moving within the range of the sensor from smaller pets and from moving branches of trees or shrubs, for example. In any event, the technology basis of the sensor does not have any relevance to the operation of the invention and any suitable sensor may be employed.

The sensors are arranged to cover three angularly adjacent sectors radiating from the mounting base, in plan view, with the central sensor (6) covering a central sector having an angular field of about 100°, as indicated by arrow "A" in FIG. 3, and the two lateral sensors (7a, 7b) each covering a lateral sector having an angular field of 60° on each side of the central sector, as indicated by arrows "B" and "C". Together therefore, the three sensors cover an angular field of operation of the security light of, in this instance, about 220°. It is to be noted that the three sensors are illustrated as having separate lenses in the drawings but they may be located behind a single continuous Fresnel lens, for example, for cost saving and expediency of manufacture.

A light source and reflector assembly (8) is mounted above the housing. The light source and reflector assembly has an angular field of illumination of about 100°, in this instance.

The light source and reflector assembly is rotatable about a generally vertical axis "A" relative to the housing, in use, so that a centreline of the angular field of illumination can be rotated from a central default position in which it is indicated by numeral (9) in either angular direction by an angle of about 60° so that the field of illumination adopts a lateral direction on generally one side or the other of the central default position. The centre line of the angular field of illumination in the lateral positions is indicated by numerals (9a) and (9b) in FIG. 3. The light source may therefore be selectively directed in a direction in which the field of illumination embraces an entire sector.

Rotation of the light source and reflector assembly is achieved utilising a stepper motor (10) mounted within the housing coaxially with the axis of rotation of the light source and reflector assembly. The stepper motor is controlled by a microcontroller (11) that would typically be in the form of a suitable programmable microprocessor.

Each of the sensors is connected to a suitable input to the microcontroller that is programmed to cause the stepper motor to receive an appropriate number of electrical pulses to move the light source assembly angularly such that an appropriate centreline referred to above is directed towards the sector in which the sensor means detected the presence of a person or moving object. Accordingly, the light source and reflector assembly is rotated in response to activation of the sensor means associated with a particular one of the adjacent sectors to illuminate that sector.

In this particular embodiment of the invention an override of a daylight switch (12) is provided so that the microcontroller will not close an electric circuit to the light source during daytime and the microcontroller is also programmed to switch off the light source a predetermined time after the relevant sensor ceases to detect any presence of a person or moving object, typically of the order of 1 to 3 minutes.

On the other hand, the microcontroller is programmed such that when one sensor is activated following on the activation of a first sensor, the light will move from the sector associated with the first sensor to the sector associated with the subsequent sensor, thereby tracking any movement of the person or moving object within the field of operation of the security light.

The microcontroller is also programmed to return the light source to the central default angular position when no sensor detects any presence of a living body and the floodlight has been switched off. Selection means may, of course, be provided to enable one of the other sectors to be selected as the default sector.

It is preferred that the microcontroller is also programmed to carry out a self calibration procedure from time to time and conveniently after a predetermined number of angular movements or events of activation of the security light have occurred.

The microcontroller can also be programmed to activate other items of security control such as those mentioned in my earlier published patent application, namely, wireless communication of the situation that has developed to a remote receiver and also, optionally, video communication.

A programming facility such as the single pushbutton operated programming facility described in my said earlier patent application may also be embodied in the security light assembly.

It will be understood that numerous variations may be made to the embodiment of the invention described above without departing from the scope hereof. In particular, the number of sectors covered may be changed and may, for example, be just two or it could be four. Generally speaking, it would not be more.

The invention claimed is:

1. A self-contained security light comprising a mounting base for attachment to a support therefor; a sensor device carried on the mounting base for detecting the presence of a person or moving object within a predetermined angular range of the sensor device with the sensor device predetermined angular range emanating from the mounting base that carries the sensor device; a plurality of sensors of the sensor device that are each operable to detect the presence of a person or moving object within one of a plurality of angularly adjacent sectors each radiating from a respective one of the sensors and which thereby each emanate from the mounting base carrying the sensors and that together cover the predetermined angular range of the sensor device;

a light source and reflector assembly carried by the mounting base and having a predetermined angular field of illumination at least equal to the angular sector of each of the angularly adjacent sectors, said light source and reflector assembly being mounted to the mounting base to be angularly movable relative to the mounting base between a plurality of positions corresponding to the plurality of angularly adjacent sectors so as to be selectively directed in a direction in which the field of illumination covers an entire sector;

a stepper motor associated with the light source and reflector assembly for rotating the light source assembly between said possible positions in response to activation of the sensor associated with a particular one of the adjacent sectors; and a microcontroller connected to said sensor device and to the stepper motor, the microcontroller being configured to receive separately an activation output from each of the plurality of sensors and to associate each of the angularly adjacent sectors with one of the plurality of sensors, the microcontroller being programmed to recognize from which one of the plurality of sensors an activation output is being received and to cause the stepper motor to receive a required number of electrical pulses to move the light source and reflector assembly angularly, as may be necessary, such that it becomes directed towards one of the sectors in which a sensor device was activated by detecting the presence of a person or moving object within that sector.

2. A security light as claimed in claim 1 in which the number of adjacent sectors is selected from two, three, and four.

3. A security light as claimed in claim 1 in which the light source is a floodlight.

4. A security light as claimed in claim 1 in which the mounting base is adapted for mounting to an upright mounting surface such that the light source assembly is angularly movable about a generally upright axis.

5. A security light as claimed in claim 1 in which the microcontroller is programmed to cause the light source to be switched on and off in response to the detection of a person or moving object by the sensor device.

6. A security light as claimed in claim 1 in which the microcontroller is programmed to return the light source to a predetermined default angular position when the sensor device fails to detect any presence of a person or moving object.

7. A security light as claimed in claim 1 in which the microcontroller is programmed to carry out a self calibration procedure.

8. A security light as claimed in claim 1 wherein the predetermined angular field of illumination of the light source and reflector assembly is larger than at least one of the plurality adjacent sectors of a corresponding one of the sensors such that when the presence of a person or moving object is detected by the one sensor in the one sector, the light source and reflector assembly is moved to illuminate the entirety of the one sector whereby respective center lines of the predetermined angular field and the one sector, although both generally emanating from the location of the mounting base, need not be coincident.

9. A security light comprising a mounting base for attachment to a support therefor; a sensor device carried on the mounting base for detecting the presence of a person or moving object within a predetermined angular range of the sensor device with the sensor device predetermined angular range emanating from the mounting base that carries the sensor device; a plurality of sensors of the sensor device that are each operable to detect the presence of a person or moving object within one of a plurality of angularly adjacent sectors each radiating from a respective one of the sensors and which thereby each emanate from the mounting base carrying the sensors and that together cover the predetermined angular range of the sensor device;

a light source and reflector assembly having a predetermined angular field of illumination at least equal to the angular sector of each of the angularly adjacent sectors, said light source and reflector assembly being mounted to the mounting base to be angularly movable relative to the mounting base between a plurality of positions corresponding to the plurality of angularly adjacent sectors so as to be selectively directed in a direction in which the field of illumination covers an entire sector;

a stepper motor for rotating the light source assembly between said possible positions in response to activation of the sensor associated with a particular one of the adjacent sectors; and a microcontroller connected to said sensor device and to the stepper motor and programmed to cause the stepper motor to receive a required number of electrical pulses to move the light source and reflector assembly angularly, as may be necessary, such that it becomes directed towards one of the sectors in which the sensor device detected the presence of a person or moving object, wherein the predetermined angular field of illumination of the light source and reflector assembly is larger than at least one of the plurality adjacent sectors of a corresponding one of the sensors such that when the presence of a person or moving object is detected by the one sensor in the one sector, the light source and reflector assembly is moved to illuminate the entirety of the one sector whereby respective center lines of the predetermined angular field and the one sector, although both generally emanating from the location of the mounting base, need not be coincident, wherein the one sector comprises a pair of lateral sectors, and a central one of the sectors between the lateral sectors that is the same size as the predetermined angular field of illumination of the light source and reflector assembly and larger than each of the lateral sectors.

10. A security light as claimed in claim 1 wherein the mounting base includes a housing in which the plurality of sensors are contained, and the light source and reflector assembly is rotatably mounted about a single rotary axis extending between the light source and reflector assembly and the housing.

11. A security light as claimed in claim 10 wherein the housing includes a motor therein for driving the light source and reflector assembly about the single rotary axis.

* * * * *